Oct. 4, 1938.   J. TATE   2,132,056
FUNNEL SUPPORT
Filed Dec. 8, 1936
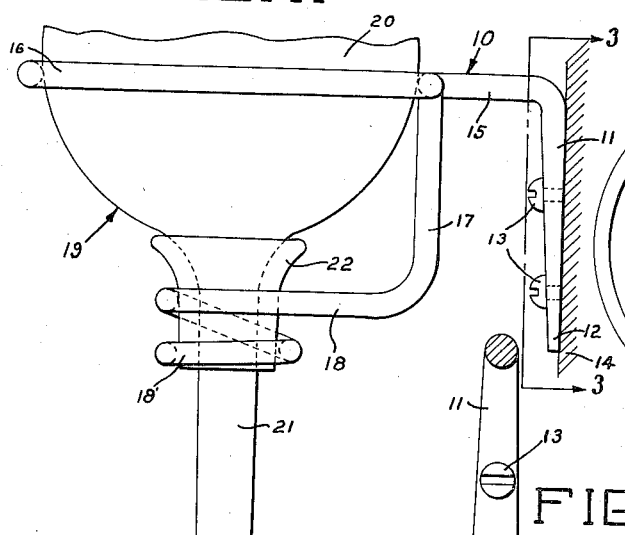
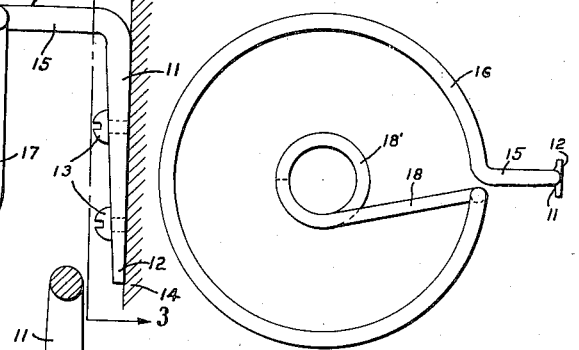
INVENTOR.
JAMES TATE
BY
ATTORNEY.

Patented Oct. 4, 1938

2,132,056

UNITED STATES PATENT OFFICE 2,132,056

FUNNEL SUPPORT

James Tate, Los Angeles, Calif.

Application December 8, 1936, Serial No. 114,752

1 Claim. (Cl. 248—94)

This invention relates to funnel supports.

The general object of the invention is to provide an improved support for a funnel such as the glass funnels used in making coffee.

Another object of the invention is to provide a one-piece resilient wire support for a coffee making funnel.

Other objects and advantages of this invention will be apparent from the following description taken in connection with the accompanying drawing wherein:

Fig. 1 is a side elevation of a funnel support embodying the features of my invention;

Fig. 2 is a top plan view of the support; and

Fig. 3 is a section taken on line 3—3 of Fig. 1.

Referring to the drawing by reference characters I have shown my invention as embodied in a coffee making funnel support which is indicated generally at 10. As shown this support is made of a single length of material such as resilient metal wire and includes an end portion 11 which is flattened as at 12 and is provided with apertures to receive fastening means 13 by which it may be secured upon a wall 14.

The portion 11 is connected to an outwardly extending portion 15 which merges into a circular portion 16 and this circular portion 16 is joined to a straight portion 17 which is shown as parallel to and spaced from the portion 11. The portion 17 is connected to a portion 18 which extends inwardly and this portion 18 continues as a loop portion 18'.

Since the circular portion 16 is made of resilient material and since this portion is open to expand my support is adapted to engage funnels of various sizes without injury and also the portions 17 and 18 with the loop portions 19 being resilient allows freedom of vertical movement between the portion 19 which engages the lower portion of the funnel and the circular portion 16 which engages the upper portion of the funnel so that variations in length of the funnel can also be accommodated.

The funnel is indicated generally at 19 and includes an upper portion 20 and a lower portion 21. Funnels of this nature are usually provided with a cup member 22 at the juncture of the upper and lower portions and my support is adapted to receive funnels so equipped although it will also support funnels which are not provided with the cup members.

From the foregoing description it will be apparent that I have invented a novel coffee funnel holding support which can be economically manufactured and which is highly efficient in use.

Having thus described my invention, I claim:

In a coffee making funnel support, a single continuous piece of resilient material bent to form a loop portion adapted to receive the neck of a funnel, said support including an outwardly directed portion tangent to said loop portion, said material being bent to extend upwardly from said outwardly extending portion, said upwardly extending portion merging into a circular portion, said circular portion having its end free to move towards and from the upper end of the upwardly extending portion so that the diameter of the circle may vary, said circular portion having an outwardly extending radially arranged portion, said outwardly extending radially arranged portion having an end portion which extends downwardly parallel to the upwardly extending portion, said downwardly extending portion being flattened, said circular portion having a larger diameter than that of the loop portion.

JAMES TATE.